United States Patent
Alex et al.

(10) Patent No.: US 8,892,702 B2
(45) Date of Patent: Nov. 18, 2014

(54) POLICY DRIVEN AUTONOMIC COMPUTING-PROGRAMMATIC POLICY DEFINITIONS

(75) Inventors: John K. Alex, Valley Cottage, NY (US);
Reinhard Buendgen, Tuebingen (DE);
Chun-Shi Chang, Poughkeepsie, NY (US); Rong-Sheng Lee, Staatsburg, NY (US); Jeffrey S. Lucash, Hurley, NY (US); Thomas Lumpp, Reutlingen (DE); Juergen Schneider, Boebligen (DE)

(73) Assignee: International Business Machines Corporation, Armonk, NY (US)

( * ) Notice: Subject to any disclaimer, the term of this patent is extended or adjusted under 35 U.S.C. 154(b) by 2536 days.

(21) Appl. No.: 10/675,001

(22) Filed: Sep. 30, 2003

(65) Prior Publication Data

US 2005/0071449 A1    Mar. 31, 2005

(51) Int. Cl.
*G06F 15/173*    (2006.01)
*G06Q 10/10*    (2012.01)

(52) U.S. Cl.
CPC ....................................... *G06Q 10/10* (2013.01)
USPC ........................................................ 709/223

(58) Field of Classification Search
USPC ................................................. 709/223–226
See application file for complete search history.

(56) References Cited

U.S. PATENT DOCUMENTS

| | | | |
|---|---|---|---|
| 5,204,940 A | 4/1993 | Kitagawa et al. | |
| 5,369,570 A | 11/1994 | Parad | |
| 5,515,524 A | 5/1996 | Lynch et al. | |
| 5,708,798 A | 1/1998 | Lynch et al. | |
| 5,765,154 A | 6/1998 | Horikiri et al. | |
| 5,784,702 A | 7/1998 | Greenstein et al. | |
| 5,893,083 A | 4/1999 | Eshghi et al. | |
| 6,002,854 A | 12/1999 | Lynch et al. | |
| 6,058,103 A | 5/2000 | Henderson et al. | |
| 6,058,490 A | 5/2000 | Allen et al. | |
| 6,067,545 A | 5/2000 | Wolff | |
| 6,078,912 A | 6/2000 | Buerger et al. | |
| 6,151,688 A | 11/2000 | Wipfel et al. | |
| 6,311,175 B1 | 10/2001 | Adriaans et al. | |
| 6,438,705 B1 * | 8/2002 | Chao et al. | 714/4 |
| 6,490,621 B1 | 12/2002 | Forget et al. | |
| 6,886,035 B2 * | 4/2005 | Wolff | 709/219 |
| 6,983,317 B1 | 1/2006 | Bishop et al. | |
| 7,272,625 B1 | 9/2007 | Hannel et al. | |
| 7,321,926 B1 | 1/2008 | Zhang et al. | |
| 2002/0019864 A1 | 2/2002 | Mayer | |
| 2002/0147764 A1 | 10/2002 | Krupczak | |
| 2002/0174207 A1 | 11/2002 | Battou | |
| 2002/0188711 A1 * | 12/2002 | Meyer et al. | 709/223 |

(Continued)

*Primary Examiner* — Scott Christensen
(74) *Attorney, Agent, or Firm* — Fleit Gibbons Gutman Bongini & Bianco PL; Jose Gutman

(57) ABSTRACT

An autonomic computing system and method determine that a desired end state cannot be reached, determine that an acceptable sub-state can be reached using at least one of priority ratings, conditional relationship specifications, and alternative relationship specifications, and place the computing system in an acceptable sub-state. The priority ratings can contain an attribute assigned to a policy definition that determines a sequence for applying the policy definition. The attribute can be "mandatory", a numerical value, or "not required". The conditional relationship specifications have policy definitions that are applied when the state of a specified resource meets a predetermined requirement. An alternative relationship specification has policy definitions and/or conditional relationship specifications that are applied when the state of a specified resource does not meet a predetermined requirement.

21 Claims, 11 Drawing Sheets

(56) References Cited

U.S. PATENT DOCUMENTS

| | | | |
|---|---|---|---|
| 2002/0198996 A1* | 12/2002 | Sreenivasan et al. | 709/226 |
| 2003/0009551 A1* | 1/2003 | Benfield et al. | 709/224 |
| 2004/0210670 A1* | 10/2004 | Anerousis et al. | 709/238 |
| 2004/0267865 A1 | 12/2004 | Cuervo | |
| 2005/0027862 A1 | 2/2005 | Nguyen et al. | |
| 2005/0033846 A1* | 2/2005 | Sankaranarayan et al. | 709/226 |
| 2005/0071449 A1 | 3/2005 | Alex et al. | |
| 2005/0091351 A1 | 4/2005 | Badovinatz et al. | |
| 2005/0091352 A1 | 4/2005 | Alex et al. | |
| 2006/0129640 A1 | 6/2006 | Farchmin et al. | |
| 2006/0265490 A1* | 11/2006 | Pishevar et al. | 709/223 |

\* cited by examiner

POLICY DRIVEN AUTONOMIC COMPUTING-PROGRAMMATIC POLICY DEFINITIONS

CROSS-REFERENCE TO RELATED APPLICATIONS

The present patent application is related to co-pending and commonly owned U.S. patent application Ser. No. 10/675,828, entitled "Policy Driven Autonomic Computing—Specifying Relationships", filed on even date herewith, and is related to U.S. patent application Ser. No. 10/647,996, entitled "Policy Driven Automation—Specifying Equivalent Resources", filed on even date herewith, the entire teachings of which being hereby incorporated by reference.

BACKGROUND OF THE INVENTION

1. Field of the Invention

The present invention relates to autonomic computing systems, and more specifically to a system and method for defining programmatic policies in a policy driven autonomic computing system.

2. Description of Related Art

With the proliferation of computer systems in everyday life, our reliance on the availability of these systems has become increasingly evident. Today, computer systems control everything from our bank and commerce systems, to educational and health records, and even our entire power grids. The need for redundancy and robustness for these systems grows ever apparent. This need has given rise to a new class of computer system known as high availability systems. Typically, these systems are structured with varying degrees of redundancy that can be configured by an administrator.

In traditional administrative environments, reactions to events are either driven by system operators reacting in real time, or by a very limited set of automation actions which must be predefined for each event that may occur. Traditional solutions generally fail to address the real world complexities in that it is difficult to impossible to predefine all of the events that may occur and the actions to be taken for them—especially when one considers that sequences of events may occur which need to be reacted to. This generally creates an intractable exploding network of potential events, one proceeding from the other, all of which must be accounted for through defined actions.

There are some automated high availability products which encompass some limited state driven knowledge where a set of resources is managed with the simple rule that all must be active or none are. However, the relationships of these resources are not defined and the actions to be taken are all scripted for a given event. Other known solutions have limited definitional characteristics in that dependency relationships for ordering start/restart may be defined but the full generality is not specifiable. In these systems, the administrator must predict and program a response for every situation that may arise. Of course, it is almost impossible to consider every scenario in a complex system, much less to program a response for every condition. So, it is often the case with these systems that they will default to a shut down mode when not all the resources are available. This downtime presents a serious problem to users who rely on the robustness of a system and generally requires human intervention in order to correct.

Therefore a need exists to overcome the problems with the prior art as discussed above, and particularly for a method of defining programmatic policies in an autonomic computing system.

SUMMARY OF THE INVENTION

An autonomic computing system and method, according to an embodiment of the present invention, determine that a desired end state cannot be reached, determine that an acceptable sub-state can be reached using at least one of priority ratings, conditional relationship specifications, and alternative relationship specifications, and place the computing system in an acceptable sub-state. The priority ratings can contain an attribute assigned to a policy definition that determines a sequence for applying the policy definition. The attribute can be "mandatory", a numerical value, or "not required". The conditional relationship specifications have policy definitions that are applied when the state of a specified resource meets a predetermined requirement. An alternative relationship specification has policy definitions and/or conditional relationship specifications that are applied when the state of a specified resource does not meet a predetermined requirement.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
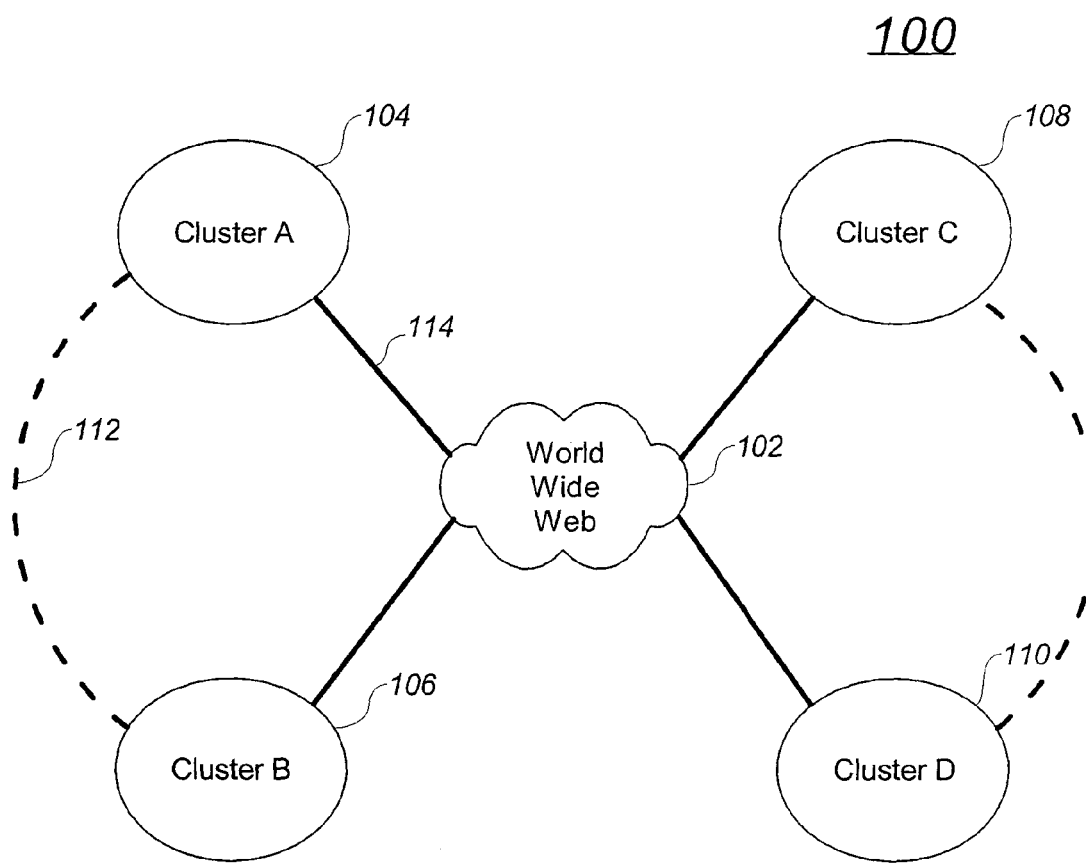
FIG. 1 is a block diagram of an autonomic computing system in accordance with an exemplary embodiment of the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention, according to a preferred embodiment, advantageously overcomes problems with the prior art by specifying relationships in a policy driven autonomic computing system. The information technology boom can only explode for so long before it becomes too cumbersome to manage by human intervention. Increasing processor might, storage capacity, and network connectivity, must report to some kind of systemic authority if we expect to take advantage of the full potential of these increasing capabilities. The human body's self-regulating nervous system presents an excellent model for creating the next generation of computing—autonomic computing.

This new paradigm shifts the fundamental definition of the technology age from one of computing, to one defined by data. Access to data from multiple, distributed sources, in addition to traditional centralized storage devices will allow users to transparently access information when and where they need it. At the same time, this new view of computing will necessitate changing the industry's focus on processing speed and storage to one of developing distributed networks that are largely self-managing, self-diagnostic, and transparent to the user.

Policy driven autonomic computing allows the system to handle complex interdependencies between system resources, provide a reliable detection of status changes, and allow quick automation of failed resources. Preferred embodiments of the present invention will be described in detail herein below with reference to the attached drawings.

A preferred embodiment of the present invention allows an administrator to define through policy the desired end state of the elements of a system by defining the relationships among the various elements of the system. An administrator specifies policies—what to start, when to start it, how long it should run, restrictions on where it should run, relative importance, etc. These statements ideally would be for the business applications that the administrator wants to run—and do not deal with how these applications are to be brought up or down by the system.

These elements, or resources, can be software programs, hardware items, or compound resources that allow for arbitrary groupings of resources. The policy specifies how the system as a whole should operate, and the automation services take all of the necessary steps to drive the system towards the end state, reacting to any perturbation of that state or intermediate state as they occur. The policies are not limited to requiring full definition of resources but can also be automatically determined ("harvested") from the resources specified.

A resource may be any physical or logical entity that provides services to other components (e.g., Network adapter, service IP address, application). In a computing system, high availability (HA) is achieved by the automated system meeting a desired end state. Policies are used to describe how to manipulate the resources to keep them in desired end states. The relationship specification which embodies the requirements for meeting a specified end state policy contains generalized definitions of how various resources are grouped, how they relate to one another, and the desired state of the resources in relation to the system and other resources. In addition, the system can cooperate with the underlying operating environment to harvest relationships among classes of resources, and specific resource to resource relationships, in order to simplify the task of the administrator in specifying the policy required.

Someday it may be possible to derive implicitly from the applications exactly what they require in order to run, and then to extract iteratively from those supporting resources (e.g., middleware) what resources they require, and so on, until base level resources are reached. However, only a small portion of this vision is possible today. Thus, the user must specify the interrelations of the resources that support the user's application—in some cases to the complete set, in others only until information can be harvested from that point down.

These interrelations are specified through a directed graph of relationships—that determine what depends upon what, which resources can be used to support other resources, what is required to start after or before other resources. This specification of relationships tells the system how the various parts relate so that a failure anywhere along the chain can be handled and so that ordering of start and stop operations can be done correctly.

It is also possible to express some policy here as well (e.g., only this set of resources is to be considered, or to restrict the selection to a subset of nodes in the cluster, etc.). Conditionals can be used to drive recovery or start or stop decisions and priorities can be assigned to allow conflicts to be resolved. The administrator also configures the system by assigning values to resources—such as an IP address to use for the application, or a file path in which to store data. This can be done at the application level, or can be done to specify what should be assigned to a resource, or even to create a given instance of a resource for the application to use.

An autonomic computing system 100 of an exemplary embodiment of the present invention is illustrated in FIG. 1. The autonomic computing system 100 of the exemplary embodiment is a network of systems containing a plurality of clusters of systems 104, 106, 108, 110. Each cluster 104, 106, 108, 110 may be in communication with the World Wide Web 102 via a communications link 114. Additionally, any cluster can be in direct communications with any other cluster via an additional communications link 112. The communications links 112, 114 could be a wired link, a wireless link, or any combination of wired and or wireless devices. In FIG. 1, cluster system A 104 is in communication with cluster system B 106. Likewise, cluster system C 108 is in communication with cluster system D 110. Each cluster may be heterogeneous in nature and distributed among various locations. Although the system illustrated is a network of systems 100, it would be obvious to one skilled in the art in view of the present discussion that the methods discussed herein will be equally applicable to individual cluster systems or even a single machine instance. Note that use of the term "cluster", as known in the art, references a specific coupling of systems which is much tighter than the more general meaning of any set of computers, as we are using the term in the present text.

Figure 2:
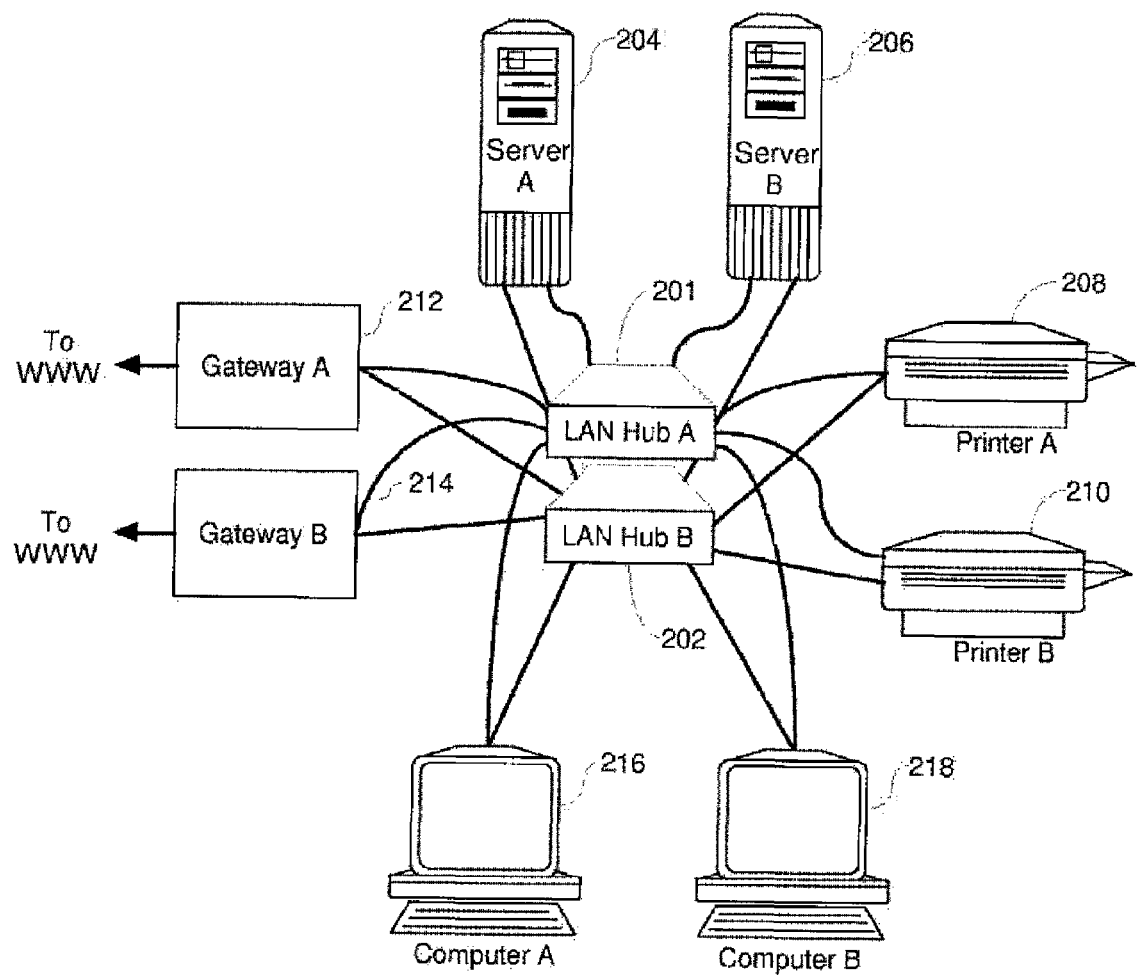
FIG. 2 is a more detailed block diagram of an exemplary cluster of the system of FIG. 1 in accordance with a preferred embodiment of the present invention.

FIG. 2 illustrates a more detailed block diagram of exemplary cluster A 104. The cluster A 104 is a group of servers and other resources that act like a single system and enable high availability. This exemplary cluster 104 includes servers 204, 206; printers 208, 210; and computer systems 216, 218 communicating via local area network (LAN) hubs 201, 202. The cluster 104 can communicate with the World Wide Web 102 through a gateway 212, 214. Note the redundancy of the devices (hub A 201 and hub B, server A 204 and server B 206, printer A 208 and printer B 210, gateway A 212 and gateway B 214). This arrangement of redundant resources is key for high availability systems and provides assurance that resource downtime will be minimized.

Figure 3:
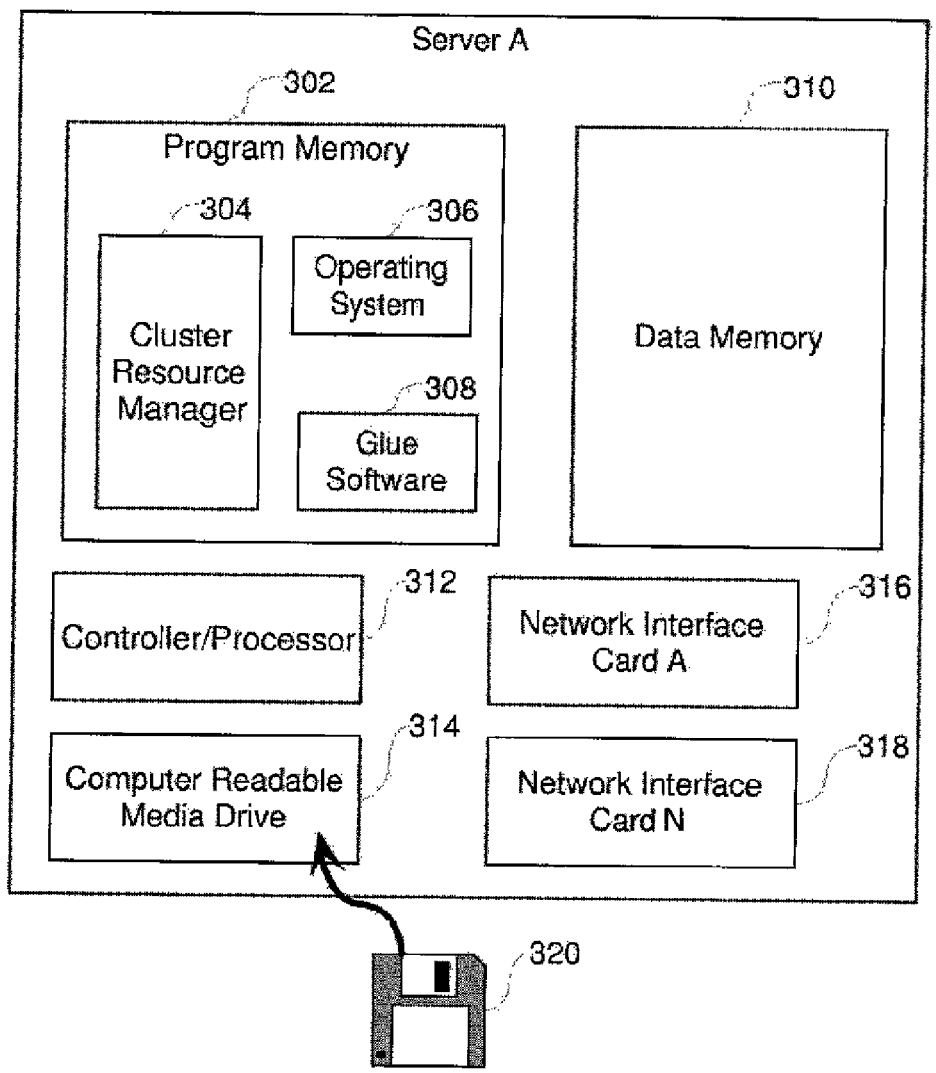
FIG. 3 is a more detailed block diagram of a server comprising a cluster resource manager, located in the cluster of FIG. 2, in accordance with an exemplary embodiment of the present invention.

A more detailed block diagram of Server A 204 is shown in FIG. 3, according to a preferred embodiment of the present invention. The server 204 also includes one or more processors 312 which processes instructions, performs calculations, and manages the flow of information through the server 204. The server 204 also includes a program memory 302, a data memory 310, and preferably random access memory (RAM) (not shown). Additionally, the processor 312 is communicatively coupled with a computer readable media drive 314, network interface cards (NIC) 316, 318, and the program memory 302. The network interface cards 316, 318 may be wired or wireless interfaces. Again, note that resources such as the NICs may be redundant to provide robustness for the system.

Figure 4:
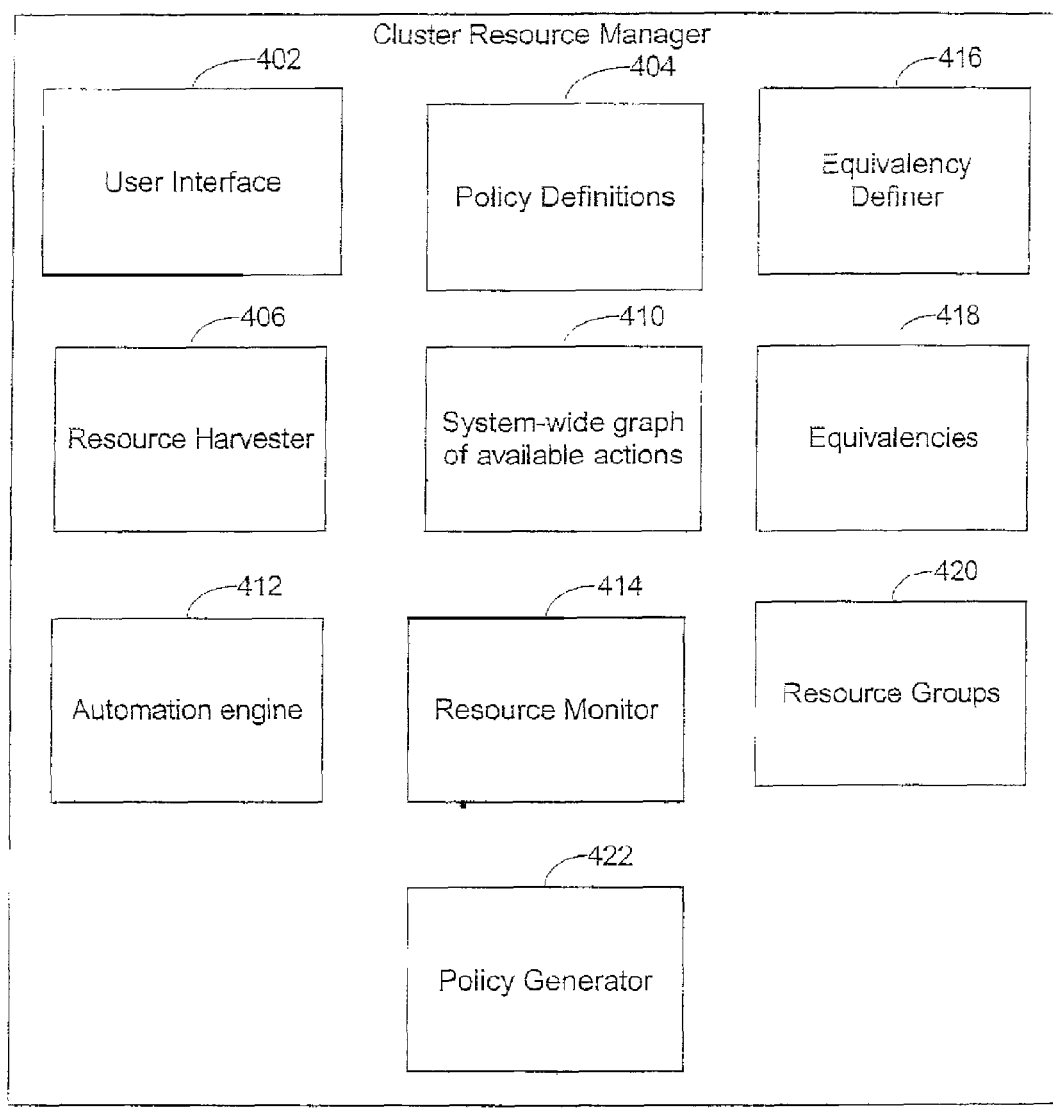
FIG. 4 is a block diagram of a cluster resource manager in accordance with an exemplary embodiment of the present invention.

Included within the program memory 302, shown in more detail in FIG. 4, are a cluster resource manger 304 (to be discussed in more detail later), operating system platform 306, and glue software 308. The operating system platform 306 manages resources, such as the information stored in data memory 310, the scheduling of tasks, and processes the operation of the cluster resource manager 304 in the program memory 302. Additionally, the operating system platform 306 also manages many other basic tasks of the server 204 in a manner well known to those of ordinary skill in the art.

Glue software 308 may include drivers, stacks, and low-level application programming interfaces (API's) and provides basic functional components for use by the operating system platform 306 and by compatible applications that run on the operating system platform 306 for managing communications with resources and processes in the server 204.

Various software embodiments are described in terms of this exemplary computer system. After reading this description, it will become apparent to a person of ordinary skill in the relevant art(s) how to implement the invention using other computer systems and/or computer architectures.

In this document, the terms "computer program medium," "computer-usable medium," "machine-readable medium" and "computer-readable medium" are used to generally refer to media such as program memory 302 and data memory 310, removable storage drive, a hard disk installed in hard disk drive, and signals. These computer program products are means for providing software to the server 204. The computer-readable medium 320 allows the server 204 to read data, instructions, messages or message packets, and other computer-readable information from the computer-readable medium 320. The computer-readable medium 320, for example, may include non-volatile memory, such as Floppy, ROM, Flash memory, disk drive memory, CD-ROM, and other permanent storage. It is useful, for example, for transporting information, such as data and computer instructions, between computer systems. Furthermore, the computer-readable medium 320 may comprise computer-readable information in a transitory state medium such as a network link and/or a network interface, including a wired network or a wireless network, that allow a computer to read such computer-readable information.

A more detailed block diagram of the cluster resource manager 304 is shown in FIG. 4. A user interface 402 allows an administrator to specify policy definitions 404 resource groups 420. In addition, a resource harvester 406 determines implicit relationships between resources through self-discovery. An equivalency definer 416 outputs a set of equivalencies 416 that is stored in memory, such as a file or record, and are determined both from implicit discovery or explicit specification. The policy generator 422 is communicatively coupled to the user interface 402, the policy definitions 404, the equivalencies 418, and the resource groups 420, and uses the information from each of these elements to construct a system-wide graph 410 to find a set of available actions. A resource monitor 414 is communicatively coupled to each resource in the cluster and to the resource harvester 406, for communicating with each resource. An automation engine 412, is communicatively coupled to the system-wide graph of actions 410, the policy definitions 404, and the resource monitor 414, and relays desired actions to each resource via the resource monitor 414 in order for the system to establish and maintain a desired end state.

The automation policy definitions, according to a preferred embodiment of the present invention, specify the user-defined system end state and are defined through the use of four elements: resources, resource groups, equivalencies, and the relationships among the resources or resource groupings (such as Start/Stop relationships, preferred priorities, or time of operation). A model for each resource has a set of attribute values, and all resources support a common set of operations (e.g. online, offline).

Figure 5:
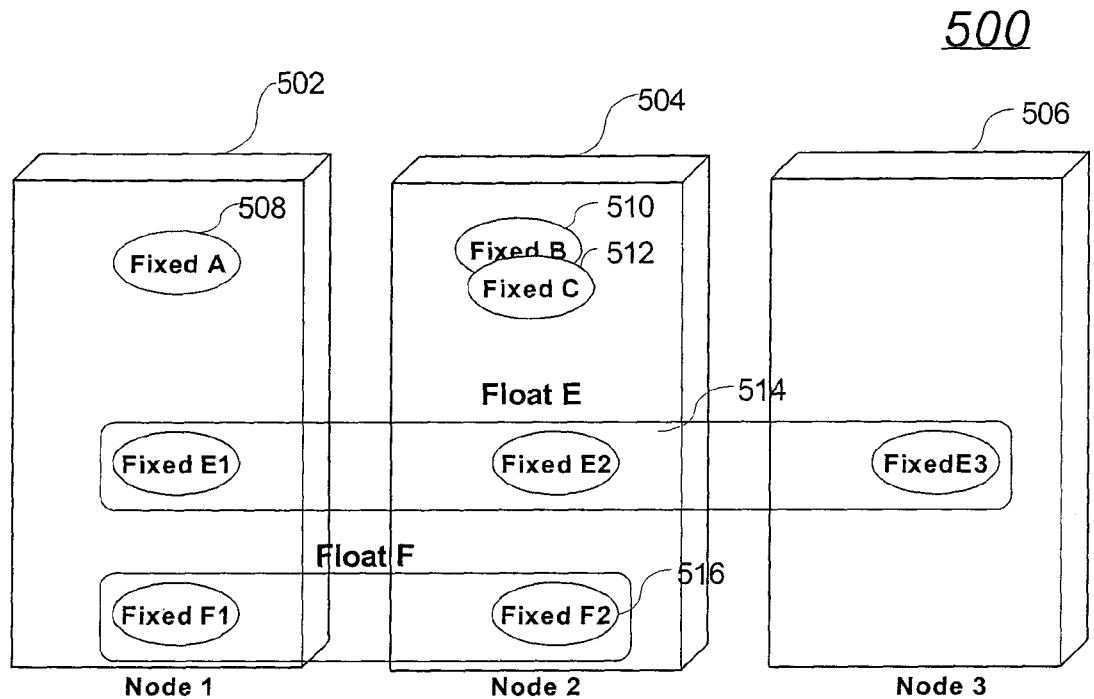
FIG. 5 is an example showing serial fixed and serial floating resource types within a cluster, in accordance with an exemplary embodiment of the present invention.

Each resource is typically globally accessible within a cluster, and can be one of three basic types—serial fixed, serial floating, or concurrent, as shown in FIG. 5. A serial fixed resource is a resource of which there is only a single instance within the cluster. It is defined upon a single node and that is where it runs. It represents one entity such as a process, a mount point or a network adapter. A serial floating resource can run on several nodes in the cluster, but only one instance of the resource may be active at any time. It represents an automatable entity such as an application or service IP address that can run on several nodes. A concurrent resource is one that can run on multiple nodes in the autonomic cluster. Referring to FIG. 5, resource A 508 is fixed on node 1 502; resource B 510 and resource C 512 are fixed on node 2 504; resource E 514 is floating and currently active on node 2 504, however it may be located on all the nodes; and resource F 516 is floating and currently active on node 1 502, but it can only be located on node 1 502 or node 2 504.

Figure 7:
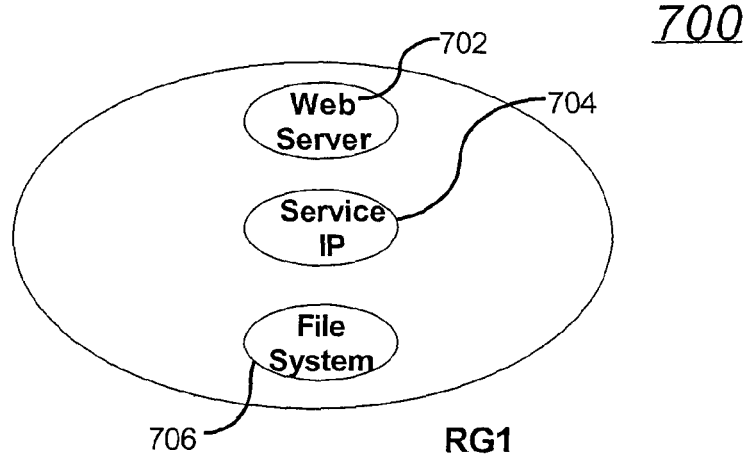
FIG. 7 is an example showing an exemplary resource group in accordance with an exemplary embodiment of the present invention.
Figure 6:
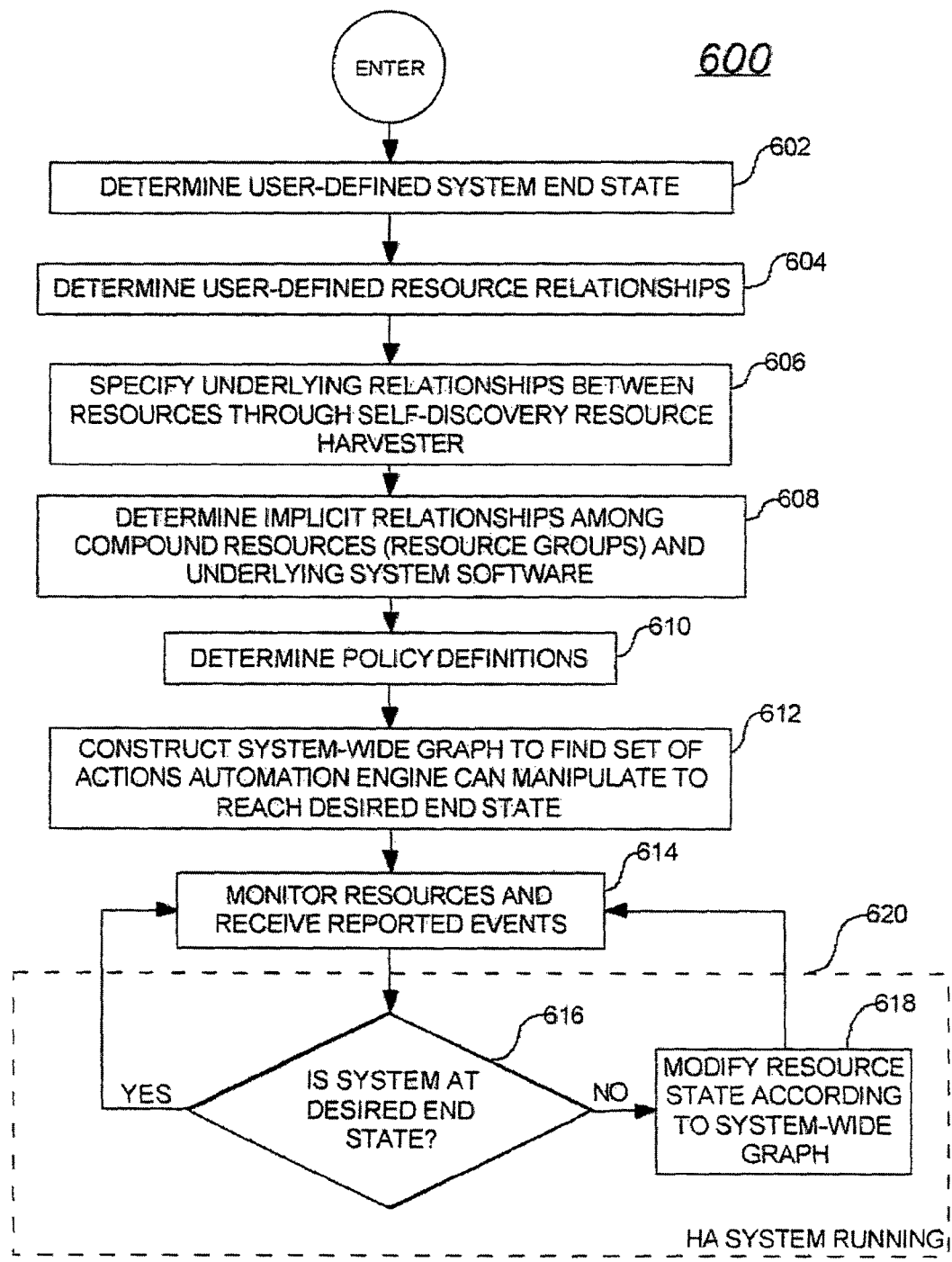
FIG. 6 is an operational flow diagram illustrating an exemplary operational sequence for the system of FIG. 1, according to a preferred embodiment of the present invention.
Figure 8:
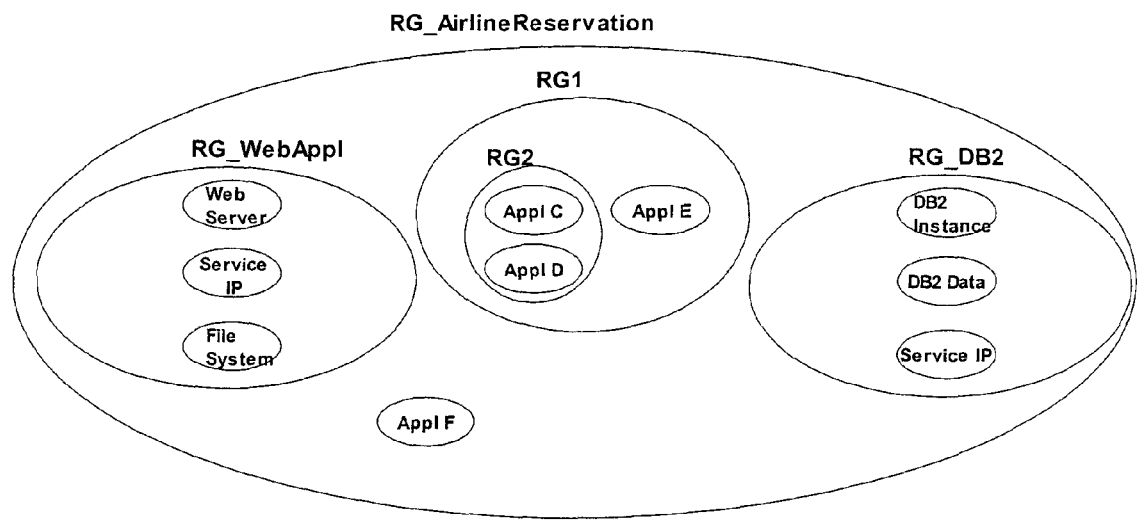
FIG. 8 is an example showing nested resource groups in accordance with an exemplary embodiment of the present invention.
Figure 9:
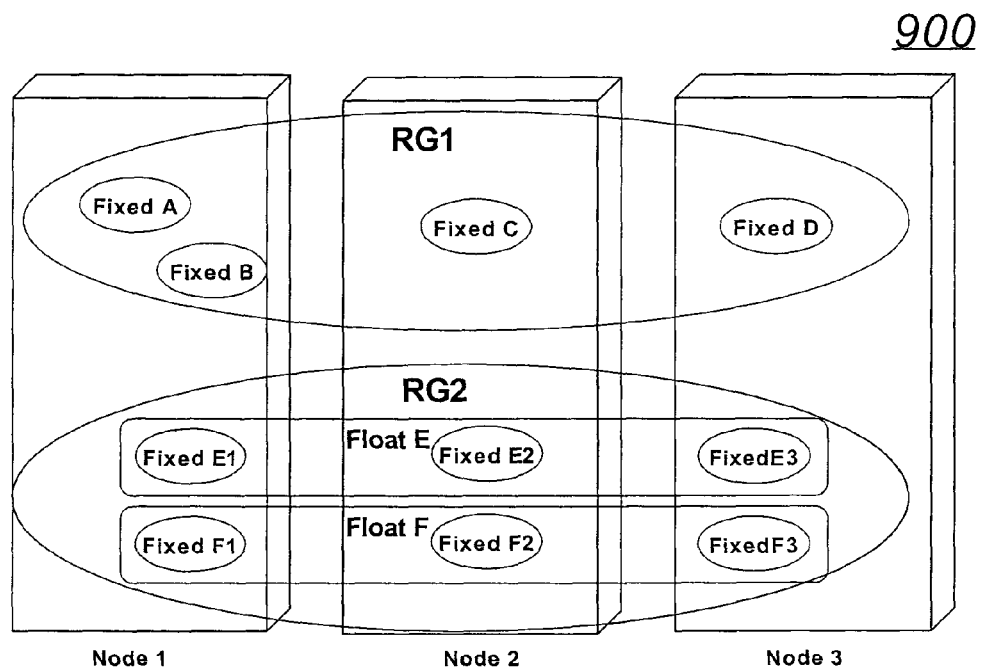
FIG. 9 is an example showing resource groups located across different systems within a cluster, in accordance with an exemplary embodiment of the present invention.

An exemplary operational flow diagram is shown in FIG. 6. The cluster resource manager 304 enters the process, at step 602, where it determines the user-defined end state. Note: the user in this instance is typically a system administrator. Next, the cluster resource manager 304, at step 604, determines the user-defined resource relationships. The administrator previously defines the desired policies, through a user interface 402 by specifying which resources are associated to which other resources—by grouping resources into virtual resources that are collections of other resources. These collections—resource groups 420, an example of which is shown in FIG. 7, are treated as one logical instance where the status of the group is the aggregation of all its members' status and a start/stop attribute of a group affects all its members. Resource group 420 members can be resources or other resource groups 420. In FIG. 7, the resource group (RG1) 700 consists of a web server 702, a service IP 704, and a file system 706. Resource groups 420 may be nested, as shown in FIG. 8, and they may be located on different systems within the cluster, as shown in FIG. 9.

A managing relationship exists between a source resource and one or more target resources. The relationships among these resources are defined through a set of directed specifications such as Resource A→dependsOn Resource B. Resource A→isCollocated with Resource C, etc. which describe how the resources are related. In addition compound resources may be defined, such as ResourceGroup 1=(contains) {Resource A, Resource B}. Only the top most resources of the system are required to be defined by the administrator if the implicit relationships can be automatically determined ("harvested")—otherwise the full set of relationships must also be determined by the administrator. The requirements and types of relationships will be discussed in more detail later.

At step 606, the resource harvester 406 of the cluster resource manager 304 finds and specifies implicit relationships through self discovery. Thus it may be discovered that Resource C→dependsOn Resource D, and Resource D→isLocated on Node 256, and Node 257 of a cluster.

Next, at step 608, the resource harvester 406 harvests a set of implicit relationships from the resources. These may come from relationships among the resources contained in a resource group 420, or from underlying system software such as the machine configuration, operating system, drivers, etc. In the case of ResourceGroup 1 above, all of its member resources (Resource A, Resource B) must be collocated and active or none may be. Thus a change in the state of Resource B may force the automation engine to drive recovery actions on Resource A in order to maintain the collocation requirement. Also note that if relationships are expressed from a compound resource on another resource (compound or not), such as ResourceGroup 1→isCollocated with ResourceGroup 2, that it may be implied that all of the members of ResourceGroup 1 must be collocated with ResourceGroup 2. A preferred embodiment of the present invention allows for default relationship specifications for defined compound resources (ResourceGroups) which may be different from other compound resources, and which allow the overall reduction in the policy statements that the administrator must specify. Thus for ResourceGroups all member resources are collocated by default, and all must be active or the other members must be stopped. It is of course possible to override these default relationships with administrator preferred relationships and for different compound resources to be defined with different implicit relationships among the members. Note that the underlying system software may also simplify the relationship definition by specifying classes of resources, such as IP addressees that contain implicit relationships on other resources. IP addresses, for example dependOn and must be collocated with a Network Interface resource.

Next, the cluster resource manager 304, at step 610, determines the policy definitions for resources, both those set by the administrator and implied from self-discovery, through the evaluation of the relationships to determine where resources should be allowed to operate, when they should operate, and the relative importance of the resources within a compound resource or between compound resources. Additionally, specification of the operational state of the resource (active/inactive), the allowed locations of the resources (nodes in a cluster), and the relationships among the resources such as: IsStartable, StartsAfter, DependsOn. Location(canRunOn), Collocation, antiCollocation, and so on, allows the desired end state of the system to be described. These policies 404 are used to construct a system wide graph 410, at step 612, which the automation engine 412 can manipulate to define a set of actions (online, offline, reset, etc.) that are issued to the resources and activated by the resources themselves that will allow the desired state to be reached. The resource monitor 414, monitors each resource of the system, at step 614, and receives events reported by the underlying system software. If the desired end state has not been reached, at step 616, the automation engine 412 will take the necessary actions to modify the state of the resources that will allow the desired state or a subset of that state to be reached—all without operator intervention. The resulting state changes (status of the actions) are reported back to the automation engine by the underlying system software in a feed back cycle 620 that allows the automation engine 412 to react to events as they occur.

This policy definition 404 is extendible as new types of relationships may be defined and implemented, new compound resources defined, automatic discovery of new or different underlying resources made by the system software, as the automation engine 412 evolves.

A concept utilized to simplify the relationship specification between resources is that of an equivalency of resources. The idea behind "equivalency" is that when a collection of resources provide the same services, one or more of these resources can be chosen to perform services. Basically, resources that have the same function (such as Network Interface Cards) but are distinct physical entities (e.g., two different physical cards), will be considered as the same, or equivalent, logically. Therefore, if a resource in an equivalency 418 fails, another resource in the equivalency 418 will be chosen to continue the services. Membership in an equivalency 418 can be specified by either statically numerating a membership list, or dynamically through discovery of resources with equivalent attributes.

This concept may be expanded to include nested equivalencies of resources, for instance, an IP address→dependsOn Network Interface where the selection of the set of Network Interfaces that are usable depends on the connectivity of the interfaces. Network Interfaces connected to the same LAN with the proper subnet mask and base address may be deemed to be equally useful to satisfy the relationship, whether these Network Interfaces are attached to the same machine or to different machines in a cluster.

Figure 10:
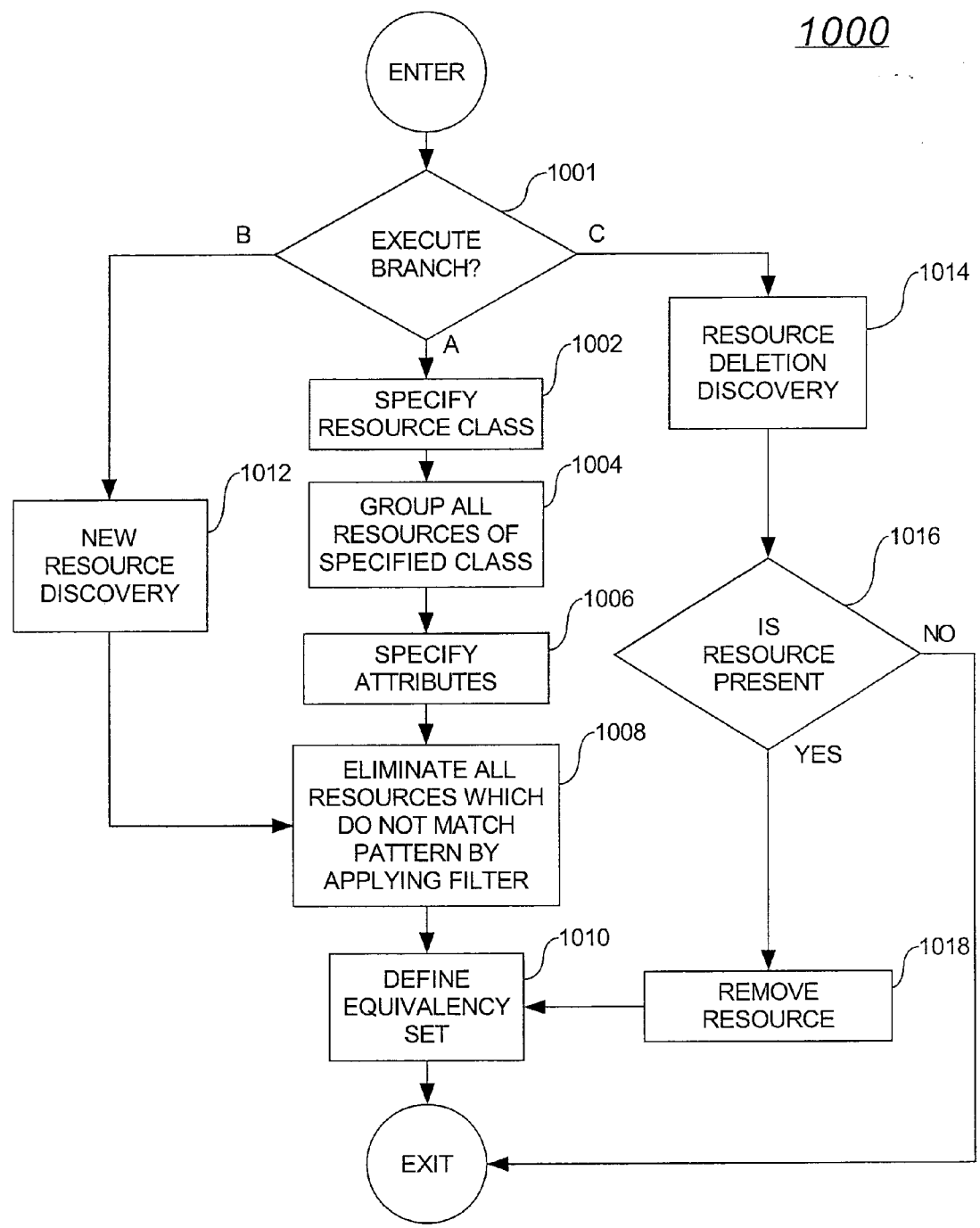
FIG. 10 is an operational flow diagram illustrating an exemplary operational sequence for the system of FIG. 1, according to a preferred embodiment of the present invention.

A preferred method for defining a set of equivalencies is shown in FIG. 10. The exemplary method shown in FIG. 10 can be called by the occurrence of one of three events, the method determining, at step 1001, the appropriate branch for the process to follow: A) a resource class is specified, B) a new resource is discovered, or C) a resource deletion is discovered. If a resource class is specified, at step 1002, all resources of the specified class are potential entries in an equivalency, and any resources of other classes are NOT potential entries. This resource class can be explicitly stated by the user or implicitly stated (e.g., if the user specifies a set of resources to be treated as "equivalent" they ALL normally will be of the same resource class). Alternatively, the system can implicitly determine the resource class to use during a harvest operation because each resource class definition also can contain the set of classes on which it "depends". These potential entries are then grouped, at step 1004, according to the specified class.

Next, at step 1006, a set of attributes that define the required functionality is specified. This attribute set can be viewed as a "filter" mechanism for the universe of resources of the desired class. This can be explicitly stated by the user, or the system can implicitly determine the attribute selection during harvest. In a preferred embodiment, a "selection" string specifying the attributes and any matching pattern that is required can be configured (with standard wild card matches allowed) and, at step 1008, all resources of the desired class whose attributes do not match the selection string are eliminated in the equivalency. At step 1010, the equivalency set is defined as all resources that match the string. During automated relationship discovery ("harvesting"), each resource discovered by the software can present a relationship which can express either a specific set of resources or a selection string to build an equivalency set.

If resources are dynamically discovered as new to the system—either because they are newly defined or additional machines have been added, the process will follow path B, and the new resources, at step 1012, are filtered through the select string, at step 1008, (if one was specified), and added as required at step 1010.

The reverse is also true. If resources are removed from the system, the process follows branch C, and the discovered resource deletion, at step 1014, is checked against the equivalency set, at step 1016. If it is determined to be in an equivalency, any such resource defined in an equivalency will be removed from the equivalency at step 1018.

As an example, consider Network Interfaces connected to the same LAN with the proper subnet mask and base address. These resources would be grouped into an equivalency 418 that could be referenced wherever IP address resources needed to specify such a relationship. Such Equivalencies 418 may be generated automatically by the equivalency definer 416, or can be explicitly specified by the administrator among all of the available resources that meet the criteria. Through the attachment of a policy selection specification expressing a desired order, such as to proceed in a round robin fashion through the set, or to return to a previous resource in the set after recovery occurs, or other desired policy, the administrator can control which Network Interface is to be selected. Thus given the active state of the Network Interfaces and the resolution of any other constraints that the administrator might have specified will result in a subset of the resources in the equivalency set being useable—and the application of the policy noted above will result in the selection of a single resource in the set as satisfying the requirements.

The above concept of equivalent resources, while self evident, is unique in the flexibility it provides for policy specification and the simplification of these resultant definitions. It becomes possible to define scenarios that allow for selections among subsets of available resources in a nested manner using this technique. Thus, if Adapter A, and Adapter B are both attached to a single hardware machine image (which is normally the case for availability reasons—avoiding a single failure causing the termination of an entire solution), then Equivalency 1=(contains) {Adapter A, Adapter B}. If, likewise Adapter C and Adapter D are attached to another hardware machine image (which again is necessary to avoid single failure problems) Equivalency 2={Adapter C, Adapter D} and so on.

It becomes possible to define a policy that specifies that an adapter failure should preferentially result in an adapter on the same machine being selected (in order to avoid the restart costs of higher level dependent software) and which states that the recovery of a machine should cause the resources to be restarted on the preferential location. This can be achieved by defining a compound resource Equivalency 3={Equivalency 1, Equivalency 2} where the selection policy for Equivalency 3 is fall back (return to failed resource when recovery occurs) and the selection policy for Equivalency 1 and Equivalency 2 is ordered (highest priority first—as specified from left to right in the membership list). This would cause the automation engine to select first from Equivalency 1—highest priority in Equivalency 3, and if no adapter is active in Equivalency 1 to select a resource from Equivalency 2. Should the adapter chosen in Equivalency 1 fail, the automation engine 412 would attempt to select the other adapter in Equivalency 1, and if it was not available, would attempt to use an adapter in Equivalency 2. If the adapters in Equivalency 1 later become available (perhaps because the machine recovers) the automation engine could then select one of the adapters in Equivalency 1 and relocate the resources to that machine if a fall back policy had been specified by the administrator.

Another benefit of the preferred embodiment of the present invention is that specifying conditional relationships is allowed, which are evaluated in regard to the specific resource state when the relationship is applied, or which are activated when a specific resource state is reached. This allows the system to apply alternative policies when different resource states are present and allows for dynamic ("runtime") adjustment of the administrator's policy specifications. Thus if it is necessary for a resources to be activated on the same node as another resource if that resource is not online (and thus for both to be activated on the same node), but to be activated on a different node if the resource is already active the usage of conditional statements such as "if online" or "if offline" will allow such dynamic policy evaluations.

Note that the full implementation of the administrator's desired policy may not be possible if all resources are not operational in the system. The specification of preferential end states is allowed through resource prioritization within a compound resource (Resource Group) or between resources (compound or otherwise), such that, if it is not possible to arrive at the total system end state specified by the administrator's policy an allowable substate may be reached for the preferred set of resources. Priority specifications such as Mandatory, NotMandatory, or priority ratings, allow the automation engine 412 to determine the desired end state among a conflicting set of end states which are possible from the policy definition 404. This allows a partial solution of the policy if the total desired end state cannot be met, and automatic action when resource events occur which enable other subsets of the desired state to be reached. Note that relationships may also have implicit prioritization—hard relationships (Collocation) are Mandatory, soft relationships (Affinity) are Not Mandatory. In addition, prioritization via Non-Mandatory allows for the start or restart of resources (compound or otherwise) which might not otherwise be able to be activated or reactivated.

The relationships among the resources in the preferred embodiment of the present invention are from three basic types: start/stop relationships, location relationships, and priority relationships. Start/stop relationships are of three varieties: StartAfter, DependsOn, and DependsOnAny. A StartAfter relationship implies a startup sequencing; therefore, if Appl A→StartAfter Service IP, then the Service IP must be running before Appl A may start. The main idea of A DependsOn relationship is that if Appl A→DependsOn Appl B, then If B is gone, A does not work. For DependsOn there is an implicit collocation relationship for Appl A and Appl B, but note that for DependsOnAny relationships, the resources are not required to be collocated.

Location relationships define location constraints between resources. These may be hard constraints, such as: Collocated (resources must be on the same location) and AntiCollocated (resources must be on different locations), or soft constraints, such as: Affinity (resources should run on the same location) and AntiAffinity (resources should run on different locations). Other relationships may have implied location references as is the case with WhereStartable which restricts the available nodes to those that are allowable for the target resource or resources.

Priority relationships allow for the selection of resources and relationships to be applied when conflicts arise. It is often the case, that conflicts are created when ALL of the desired resources (such as nodes within a cluster) are not available due to failure, maintenance, or the removal of resources while the system was off line. It is therefore important to allow the administrator to specify which among a subset of the total resources should be activated when it is impossible to reach the desired end state due to some outage event. For example (where ResourceGroup is a compound resource containing member resources which share certain implicit relationships), if ResourceGroup 1→antiCollocated with ResourceGroup 2, and only one node of a two node cluster is currently active it is obviously impossible to reach the desired end state.

As can be seen any number of relationship possibilities can be defined and expressed by the preferred embodiment of the present invention. These relationships establish the definition of any association between any set of resources.

Figure 11:
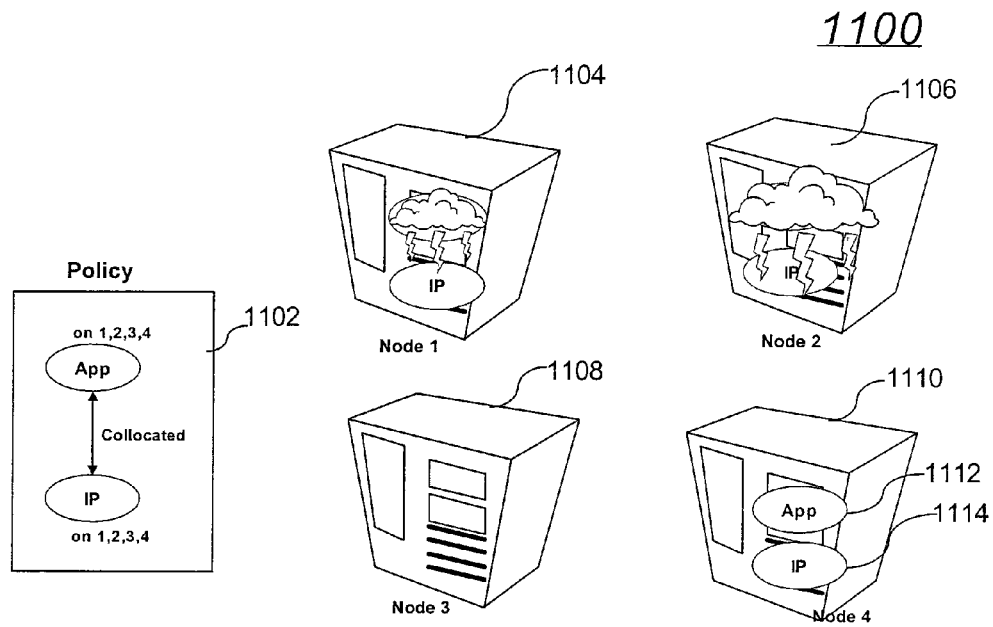
FIG. 11 is an exemplary scenario demonstrating a collocation relationship between resources, in accordance with an exemplary embodiment of the present invention.

A scenario involving collocated resources is shown in FIG. 11. The system 1100 is configured with the policy 1102 App→Collocated IP. A catastrophic failure occurs to node 2 1106 wherein both the App and the IP become unavailable. If the automation engine 412 attempts to bring up the App and IP resources on node 1 1104, but one resource, such as the App, fails to start, IP cannot remain on node 1 1104. Instead, both the App 1112 and the IP 1114 must be to the same location, in this case, node 4 1110.

Figure 12:
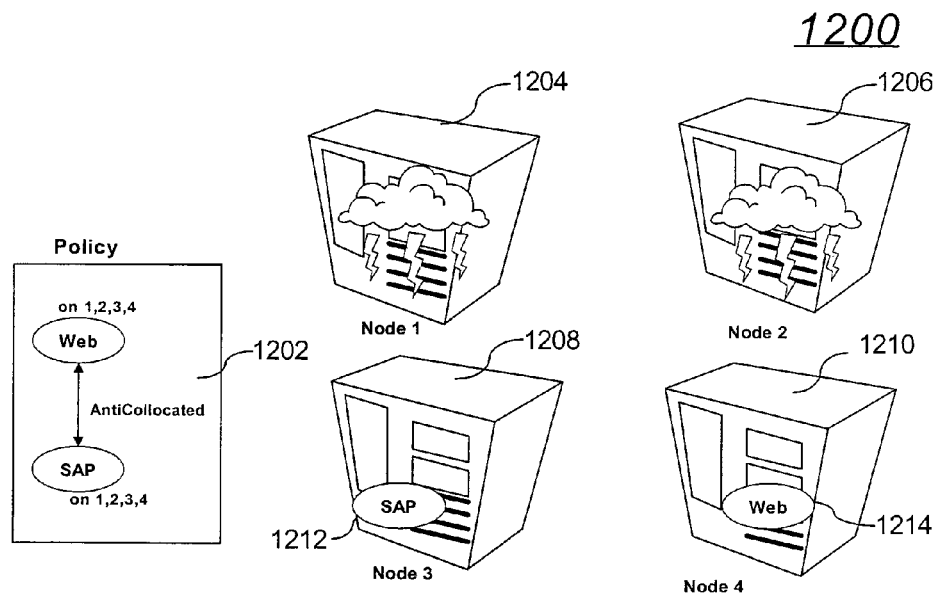
FIG. 12 is an exemplary scenario demonstrating an anti-collocation relationship between resources, in accordance with an exemplary embodiment of the present invention.

FIG. 12 illustrates an example when resources have an AntiCollocated relationship. The system 1200 is configured with the policy 1202 Web→AntiCollocated SAP. If a catastrophic failure occurs to both node 1 1204 and node 2 1206 wherein both the Web and the SAP become unavailable, the automation engine 412 will be forced to bring up one resource, SAP 1212, on node 3 1212, and the other resource, Web 1214, on node 4 1214, in order to meet the AntiCollocated relationship requirement.

It is possible to define relationships between resource groups, resources, and equivalencies in a variety of combinations in the preferred embodiment. The relationships can be defined between resources running on different systems within the heterogeneous cluster.

During the definition of the policy relationships among the resources in a system, such as Resource A→DependsOn Resource B, the automation engine 412 can determine that the specified end state desired by the policy is in fact achievable (meaning that if all of the desired hardware is operational, there is a placement of the resources specified such that all of the resources can be activated without violating the relationship specifications).

Figure 13:
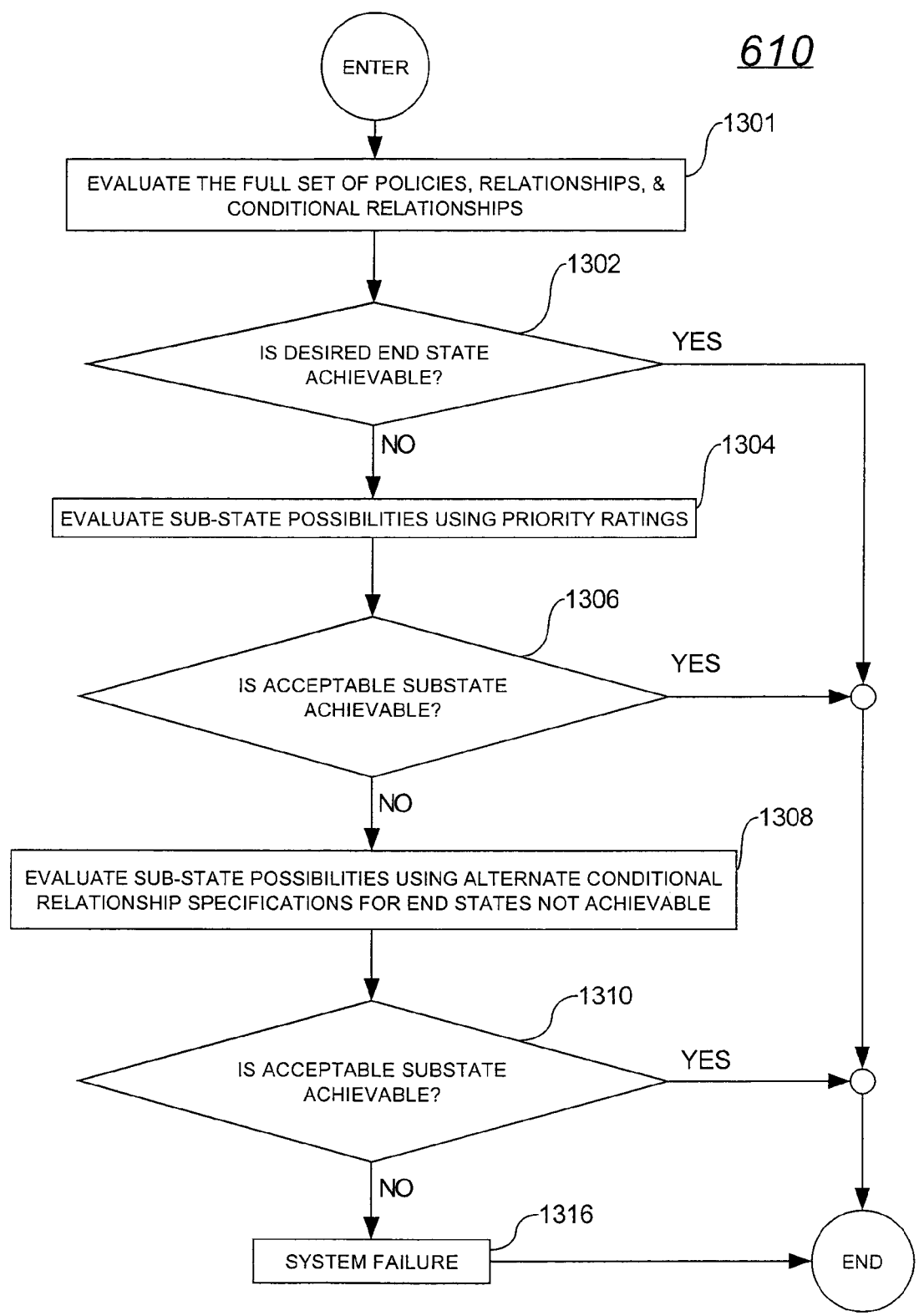
FIG. 13 is an operational flow diagram illustrating an exemplary operational sequence for the system of FIG. 1, according to a preferred embodiment of the present invention.

FIG. 13 shows an exemplary operational flow diagram of a procedure that may be performed during the creation of the policy definitions 404 (Step 610 in FIG. 6) to allow enhanced flexibility of the systems and deliver the greatest likelihood of success. The policy generator 422 enters the method at step 1301 where it determines if the desired end state is actually achievable (all the desired hardware is working and the specified resources may be placed such that they can be activated without violating the relationship specifications, and where they meet the required mandatory conditional relationships). If so, the method ends and the cluster resource manager 304 will continue the method of FIG. 6 at step 612. The evaluation of conditional relationships allows the selection of desired end states given the end state of another resource (or resources); Resource C→CollocatedWith, IfOnline Resource D; Resource C→AntiCollocatedWith, IfOnline Resource E, can be used to force certain location constraints to occur. Such programmatic relationships can be specified between resources and/or compound resources and allow the run time adjustment of the administrator's policies.

However, if it is impossible to achieve the desired end state, the policy generator 422 at step 1304 evaluates substate possibilities using priority ratings and eliminating those soft relationships which prevent a solution. For example (where ResourceGroup is a compound resource containing member resources which share certain implicit relationships), if ResourceGroup 1→AntiCollocated with ResourceGroup 2, and only one node of a two node cluster is currently active, it is obviously impossible to reach the desired end state. If, however, the administrator could specify that ResourceGroup 1 is Mandatory (MUST be active if at all possible) and ResourceGroup 2 is not, or if ResourceGroup 1 has a priority rating of 1 while ResourceGroup 2 has a priority rating of 3 (where 1 is the highest and n is the lowest), then the automation engine 412 can decide that ResourceGroup 1 should be activated due to the conflict with ResourceGroup 2. The specification of prioritization, and attributes such as Mandatory may allow such acceptable subsets to be found by determining a sequence for application of the policy definitions.

However, if an acceptable substate still cannot be found, at step 1306, it is also desirable to allow the policy generator 422 to evaluate other conditional relationships specifications, at step 1308, which take place when the state of a specified resource is known and the full set of relationships do not result in a solution at steps 1301, 1302. Conditional relationships allow policy definitions to be applied when the state of the specified resource meets a predetermined requirement. Thus If Resource A→CollocatedWith Resource B if that resource is active, but can be placed elsewhere if Resource B is not active, it is necessary to specify a conditional operator on the relationship specified above. Thus, Resource A→AntiCollocatedWith, IfOnline Resource B, forcing the location of Resource A ONLY if Resource B itself is active or can be activated. Additional conditionals can be defined (if- Online, ifOffline, ifOnNodex) which provide the administrator with the ability to control the policy when a given state for the system occurs.

If an acceptable substate still cannot be achieved, at step 1310, it is possible to evaluate alternative relationships which are applicable if the desired end state cannot be met and which therefore provide an alternative end state. Alternative relationships provide a policy definition or conditional relationship that can be applied when the required resource state of a first conditional relationship is not met. Thus, a conditional ifNotAchievable defines such alternate acceptable end states and can be used to modify relationships. ifNotAchievable (Resource C→CollocatedWith, IfOnline Resource D); ifNotAchievable (Resource C→AntiCollocatedWith, IfOnline Resource E), can be used to force certain location constraints to occur. Such programmatic relationships can be specified between resources and/or compound resources and allow the fine tuning of the administrator's policies. If an acceptable substate still cannot be achieved, at step 1310, this results in a system failure, at step 1316.

It is of course possible to define additional such relationships, and to provide what is essentially an interpreted policy with various "If, then, else" clauses to allow the description in depth of arbitrary end state policies. The preferred embodiment of the present invention has defined programmatic policy verbs that allow various interactions to be described—such as specifying which resource or resource sets MUST always be active, which ones can be ignored if they force a conflict with the desired end stale, which sets are more important (or less important) than others, and which resources or sets of resources should only be active or inactive when other resources are online or off line (IfOnline, or IfOffline specifications).

Figure 14:
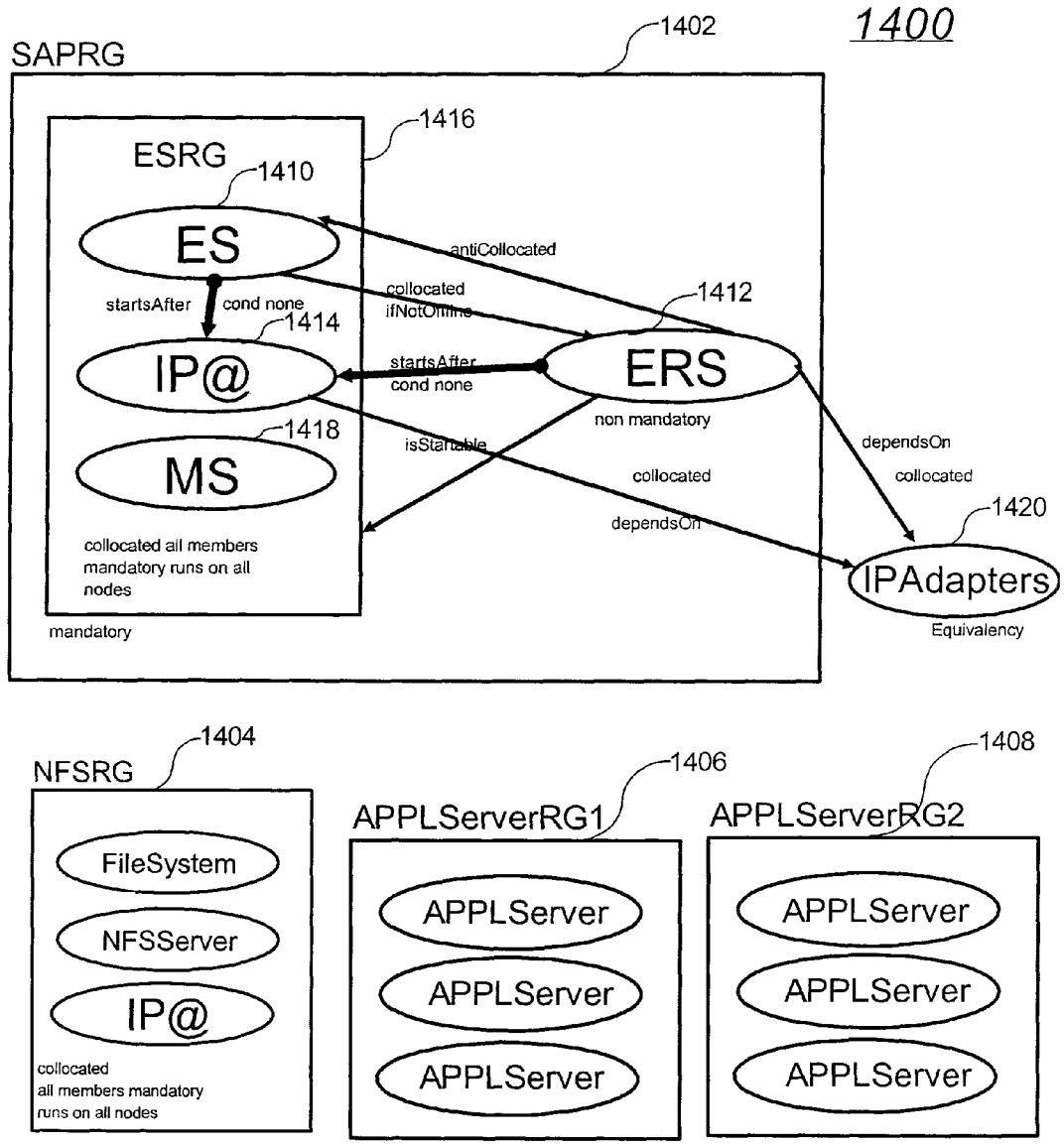
FIG. 14 is an exemplary scenario implementing the techniques described herein in a server application, in accordance with an exemplary embodiment of the present invention.

Turning now to FIG. 14, we examine an exemplary implementation of a high availability computing system which uses the techniques described herein. This is an example of the policy relationships to enable a HA server application system 1400. This is a complex application that ensures a fast restart by maintaining state information in a backup server store on a different machine than the one where it currently is operating. Recovery is done by restarting the server application where its saved state store can be found and then restarting the state store on an alternate machine—thus ensuring that state can be continuously saved and will be available following any subsequent failure.

The server application is constructed of several parts:
A set of application servers 1406, 1408 providing services for the end users;
An NFS file system 1404 providing a shared store for the parts;
A server (ES) 1410; and
A Recovery Server (ERS) 1412.

The recovery server 1412 acts as a hot backup for the server 1410 so that a failure can be quickly recovered from. As such it has several unique requirements:
It must always be started on a node where the server itself is not running
It cannot be started on a node where the server itself cannot run (this can occur if the IP@ noted as part of the server cannot operate on that node)
It must be started after the server 1410 itself has been started (so that it does not take the only node that may be available to the server 1410)
The server 1410 has the following characteristics:

If the server 1410 fails it recovers its state from the recovery server 1412 and therefore must be restarted on the same node as the recovery server 1412 IF the recovery server 1412 is active
After it recovers its state, the recovery server 1412 should be stopped and restarted on another node so that it will be available to service another failure.
The server 1410 must be located on a node where its IP@ 1414 can be made available (not all network cards can support the IP@ 1414—this is dependent on characteristics of the networks the user defines such as subnet masks and addresses)

These rules above produced the following set of relationships and conditionals:
The server 1410 is in a Resource Group 1416 (this implies default collocation and establishes a default starts after to simplify the configuration steps required—but these may be assumed to be specified) with its IP@ 1414 and its message server 1418 (another process which is part of the server)
Server→collocated (message server & IP@)
Server→depends on (message server & IP@)
Server→starts after (IP@ & message server)
All members are mandatory (if one fails the entire set must be considered to have failed—and must be restarted)
Server→runs on (all nodes)
IP@→depends on Equivalency (network IP adapters) (This establishes a subset of the total nodes that the IP@ 1414 and thus the rest of the members can run on)
The Recovery Server 1412 has the following relationships:
Recovery Server is non-mandatory (If it cannot be started because there is no suitable node for it the main server itself will still operate)
Recovery Server→starts after the server
Recovery Server→anti-collocated to the server (The recovery server 1412 MUST be started on a node where the server 1410 itself is not running)
Note: This rule is ONLY applied when the recovery server 1412 is started. It is not enforced while it is running. This allows the server 1410 to be restarted local to the recovery server 1412 after it fails.
This could have been stated as a conditional
Recovery Server if self not online→AntiCollocated to server
Recovery Server→WhereStartable Server (only start the recovery server of a node where the Server 1410 itself may be restarted after failure)
Recovery Server→collocated IP@ (not shown) (The recovery server is hot backup with the server and is in communication with it—as such it has an IP@ that is used for communication)
IP@→depends On Equivalency (network IP@) (This is the may be the same Equivalency as the Server 1410 since the server 1410 must be able to run on the node selected) This is NOT required to be the same Equivalency as the where Startable statement will force out of consideration any adapter that is not in both Equivalencies.

There is one more thing to note: The recovery server 1412 stops itself after it has completed refreshing the server 1410 from its hot standby store. The relationships then come into play to restart it on another node (if possible).

Now, applying the above considerations to the present example:

The Recovery Server 1412 starts after the Server 1410—therefore the Server 1410 is started first.

The server 1410 is collocated with the IP@ 1414 and the Message server 1416—all of which indicate that all nodes are acceptable.

BUT the IP@ is dependent and collocated on an Equivalency of network adapters which are each located on only a single node.

Thus a network adapter 1420 is selected which establishes the node on which all the resources collocated with the server 1410 are to be started.

The server resource group 1416 elements are started from bottom to top on the node selected The IP@ 1414 is started as there is a dependency on it. The server 1410 and the message server 1418 are started after the IP@ 1414 together and can be done in parallel as there is no relationship between them.

The Recovery Server 1412 is then started

The Recovery Server 1412 must be started on a node where the server 1410 is NOT running (anticollocated)

If there is a node available where the Server 1410 itself can be started the Recovery Server 1412 is started on one of those nodes.

If no such node is available the Recovery Server 1412 is NOT started

If the Recovery Server 1412 fails:

It is restarted on another node where the server 1410 itself can be started if one is available or it is not restarted.

If the Server 1410 fails: (Any of the elements—the server 1410, the message server 1418, or the IP@ 1414—they are all collocated and mandatory and hence the grouping must be restarted if any fail).

If the Recovery Server 1412 is running the Server group 1416 is started on the same node in the same manner in which it was originally started. This is a result of the ifNotOnline collocated relationship.

(If it cannot be restarted or fails in being restarted on that node—hot backup is not possible and it is started on another node).

After it is started the recovery server 1412 passes the necessary hot backup information and stops itself.

When the recovery server 1412 fails it is restarted in the same manner it was originally started (eg. On a node where the server 1410 is not running—this could be the original node where the server 1410 was started at the beginning).

The other ancillary resources—NFS 1404 and application servers 1406, 1408 are independent of the servers 1410, 1412 and each other and have their own rules (noted in the NFS group 1404) which drives their start and restart after failure.

Alternative Embodiments

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when loaded and executed, controls the computer system such that it carries out the methods described herein.

The present invention can also be embedded in a computer program product, which comprises all the features enabling the implementation of the methods described herein, and which—when loaded in a computer system—is able to carry out these methods. In the present context, a "computer program" includes any expression, in any language, code or notation, of a set of instructions intended to cause a system having an information processing capability to perform a particular function either directly or after either or both of the following: a) conversion to another language, code, or notation; and b) reproduction in a different material form.

Each computer system may include one or more computers and a computer readable medium that allows the computer to read data, instructions, messages, or message packets, and other computer readable information from the computer readable medium. The computer readable medium may include non-volatile memory such as ROM, Flash memory, a hard or floppy disk, a CD-ROM, or other permanent storage. Additionally, a computer readable medium may include volatile storage such as RAM, buffers, cache memory, and network circuits. Furthermore, the computer readable medium may include computer readable information in a transitory state medium such as a network link and/or a network interface (including a wired network or a wireless network) that allow a computer to read such computer readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method comprising:

receiving at least one policy definition defined by a user, wherein the at least one policy definition includes at least one conditional relationship specification, and wherein the at least one policy definition programmatically specifies relationships between at least two resources in a set of resources in an autonomic computing system and defines at least one desired end state therefore, and wherein the at least one conditional relationship specification indicates a relationship between at least two resources based on a state associated with each of the at least two resources, and wherein the at least on conditional relationship specification comprises at least one conditional statement, and wherein the at least one policy definition programmatically specifies relationships by using states associated with the at least two resources, wherein the state of one of the at least two resources depends on the state of the other resource, and indicating a decision sequence that is to be followed to reach the at least one desired end state based on the at least one conditional relationship specification;

harvesting implicit relationships among the set of resources via self-discovery, wherein the set of implicit relationships at least indicate one or more of a set of resource dependencies for at least one resource in the set of resources and location requirements for at least one resource in the set of resources, and wherein self-discovery includes automatically discovering the set of implicit relationships without the user explicitly specifying the implicit relationships;

determining, by the autonomic computing system, that a state of at least one resource in the set of resources substantially satisfies a predetermined requirement of the at least one conditional relationship specification and dependencies and requirements of the set of implicit relationships that have been harvested, wherein the set of resources includes any resources identified based on the set of implicit relationships that have been harvested;

determining, by the autonomic computing system in response to the state of the at least one resource substantially satisfying the predetermined requirement, that the desired end state can be reached by applying the at least one policy definition conditioned by the at least one conditional relationship specification; and placing the autonomic computing system in the desired end state by applying the at least one policy definition.

2. A method comprising:

receiving at least one policy definition defined by a user, wherein the at least one policy definition includes at least one conditional relationship specification, and wherein the at least one policy definition programmatically specifies relationships between resources in an autonomic computing system and defines at least one acceptable sub-state and at least one desired end state for the autonomic computing system, and wherein the policy definition indicating a decision sequence that is to be followed to reach the at least one desired end state based at least on the at least one conditional relationship specification;

determining that the desired end state for the autonomic computing system cannot be reached;

determining that the acceptable sub-state of the desired end state can be reached using at least one of priority ratings, conditional relationship specifications, and alternative relationship specifications; and placing the autonomic computing system in the acceptable sub-state as a substitution for the desired end-state, wherein the acceptable sub-state becomes a new end-state in response to the substitution.

3. The method of claim 2, wherein the priority ratings comprise an attribute assigned to a policy definition that determines at least one of a selection of conflicting policy definitions and a sequence for applying the policy definitions.

4. The method of claim 3, wherein the attribute assigned to the policy definition is one of the following: mandatory, a numerical value, and not required.

5. The method of claim 2, wherein the conditional relationship specifications comprise policy definitions that are applied when the state of a specified resource meets a predetermined requirement.

6. The method of claim 2, wherein the alternative relationship specifications comprise at least one of policy definitions, and conditional relationship specifications, that are applied when the state of a specified resource does not meet a predetermined requirement.

7. A non-transitory computer readable storage medium comprising computer instructions for performing the following:

receiving at least one policy definition defined by a user, wherein the at least one policy definition includes at least one conditional relationship specification, and wherein the at least one policy definition programmatically specifies relationships between at least two resources in a set of resources in an autonomic computing system and defines at least one desired end state therefor, and wherein the at least one conditional relationship specification indicates a relationship between at least two resources based on a state associated with each of the at least two resources, wherein the at least one conditional relationship specification comprises at least one conditional statement, and wherein the at least one policy definition programmatically specifies relationships by using states associated with the at least two resources, wherein the state of one of the at least two resources depends on the state of the other resource, and indicating a decision sequence that is to be followed to reach the at least one desired end state based on the at least one conditional relationship specification;

wherein the policy definition further comprises a set of resource relationships received that only specify relationships associated with a top-most level set of resources in the set of resources, wherein the availability of one or more of the top-most level set of resources is dependent on the availability of one or more resources of a lower level set of resources in a reverse hierarchy of dependencies from top-most level to lowest level set of resources;

harvesting implicit relationships among the set of resources via self-discovery, wherein the set of implicit relationships at least indicate one or more of a set of resource dependencies for at least one resource in the set of resources and location requirements for at least one resource in the set of resources, and wherein self-discovery includes automatically discovering the set of implicit relationships without the user explicitly specifying the implicit relationships, wherein the set of implicit relationships are relationships associated from the top-most level set of resources to a lower level set of resources in the set of resources;

determining, by the autonomic computing system, that a state of at least one resource in the set of resources substantially satisfies a predetermined requirement of the at least one conditional relationship specification and dependencies and requirements of the set of implicit relationships that have been harvested;

determining, by the autonomic computing system in response to the state of the at least one resource substantially satisfying the predetermined requirement, that the desired end state can be reached by applying the at least one policy definition conditioned by the at least one conditional relationship specification; and placing the autonomic computing system in the desired end state by applying the at least one policy definition.

8. A non-transitory computer readable storage medium comprising computer instructions for performing the following:

receiving at least one policy definition defined by a user, wherein the at least one policy definition includes at least one conditional relationship specification, and wherein the at least one policy definition programmatically specifies relationships between resources in an autonomic computing system and defines at least one acceptable sub-state and at least one desired end state for the autonomic computing system, and wherein the policy definition indicating a decision sequence that is to be followed to reach the at least one desired end state based at least on the at least one conditional relationship specification;

determining that the desired end state for the autonomic computing system cannot be reached;

determining that the acceptable sub-state of the desired end state can be reached using at least one of priority ratings, conditional relationship specifications, and alternative relationship specifications; and placing the autonomic computing system in the acceptable sub-state as a substitution for the desired end-state, wherein the acceptable sub-state becomes a new end-state in response to the substitution.

9. The computer readable medium of claim 8, wherein the priority ratings comprise an attribute assigned to a policy definition that determines a sequence for applying the policy definition.

10. The computer readable medium of claim 9, wherein the attribute assigned to the policy definition is one of the following: mandatory, a numerical value, and not required.

11. The computer readable medium of claim 8, wherein the conditional relationship specifications comprise policy definitions that are applied when the state of a specified resource meets a predetermined requirement.

12. The computer readable medium of claim 8, wherein the alternative relationship specifications comprise at least one of policy definitions and conditional relationship specifications that are applied when the state of a specified resource does not meet a predetermined requirement.

13. An autonomic resource manager for an autonomic computing system, the autonomic resource manager comprising:
    memory for storing at least one policy definition defined by a user, wherein the at least one policy definition includes at least one conditional relationship specification, and wherein the at least one policy definition programmatically specifies relationships between at least two resources in a set of resources in an autonomic computing system and defines at least one desired end state therefore, and wherein the at least one conditional relationship specification indicates a relationship between at least two resources based on a state associated with each of the at least two resources, and wherein the at least on conditional relationship specification comprises at least one conditional statement, wherein the at least one policy definition programmatically specifies relationships by using states associated with the at least two resources, wherein the state of one of the at least two resources depends on the state of the other resource, and indicating a decision sequence that is to be followed to reach the at least one desired end state based on the at least one conditional relationship specification;
    a relationship harvester for harvesting implicit relationships among the set of resources via self-discovery, wherein the set of implicit relationships at least indicate one or more of a set of resource dependencies for at least one resource in the set of resources and location requirements for at least one resource in the set of resources, and wherein self-discovery includes automatically discovering the set of implicit relationships without the user explicitly specifying the implicit relationships;
    a resource monitor, communicatively coupled with each resource in the autonomic computing system, for monitoring, and communicating data with, each resource in the autonomic computing system;
    an equivalency definer, communicatively coupled with each resource in the autonomic computing system, and with the memory, for defining at least one equivalency representing at least one set of equivalent resources in the autonomic computing system, and storing the at least one equivalency in the memory, wherein the equivalency defines the at least one set of equivalent resources that can be substituted for one another in accordance with the at least one policy definition that includes at least one conditional relationship specification to arrive at the desired end state;
    a policy generator, communicatively coupled with the resource monitor and the memory, for providing in the memory a representation of a system-wide graph of available actions and at least one of conditional relationship specifications and alternative relationship specifications, corresponding with resources in the autonomic computing system including any resources identified based on the dependencies and requirements of the set of implicit relationships that have been harvested; and
    an automation engine, communicatively coupled with the resource monitor, with at least one resource in the autonomic computing system, and with the memory, for providing available actions as defined by the at least one policy definition to the at least one resource in the autonomic computing system in order for the autonomic computing system to establish and maintain a desired end state.

14. The method of claim 1, further comprising:
    activating the at least one conditional relationship specification when the state of at least one of the at least two resources has been reached; and
    dynamically adjusting the policy definition at runtime based on the at least one conditional relationship specification that has been activated.

15. The autonomic resource manager of claim 13, wherein the priority ratings comprise an attribute assigned to a policy definition that determines a sequence for applying the policy definition.

16. The autonomic resource manager of claim 13, wherein the conditional relationship specifications comprise policy definitions that are applied if the state of a specified resource meets a predetermined requirement.

17. The autonomic resource manager of claim 13, the alternative relationship specifications comprise at least one of policy definitions and conditional relationship specifications that are applied when the complete desired end state of the system cannot be met.

18. An autonomic computing system, comprising:
    distributed resources; and
    an autonomic resource manager, communicatively coupled with the distributed resources, for receiving at least one policy definition defined by a user, wherein the at least one policy definition includes at least one conditional relationship specification, and wherein the at least one policy definition programmatically specifies relationships between resources in an autonomic computing system and defines at least one acceptable sub-state and at least one desired end state for the autonomic computing system, and wherein the policy definition indicating a decision sequence that is to be followed to reach the at least one desired end state based at least on the at least one conditional relationship specification, determining that the desired end state for the autonomic computing system cannot be reached, determining that acceptable sub-state of the desired end state can be reached using at least one of priority ratings, conditional relationship specifications, and alternative relationship specifications, and placing the autonomic computing system in acceptable sub-state as a substitution for the desired end-state, wherein the acceptable sub-state becomes a new end-state in response to the substitution.

19. The autonomic computing system of claim 18, wherein the priority ratings comprise an attribute assigned to a policy definition that determines a sequence for applying the policy definition to the operation of the distributed resources.

20. The autonomic computing system of claim 18, wherein the conditional relationship specifications comprise policy definitions that are applied if the state of a specified resource meets a predetermined requirement.

21. The autonomic computing system of claim 18, wherein the alternative relationship specifications comprise at least one of policy definitions and conditional relationship specifications that are applied when the complete desired end state of the system cannot be met.

\* \* \* \* \*